(12) United States Patent
Smidth

(10) Patent No.: US 8,094,767 B1
(45) Date of Patent: Jan. 10, 2012

(54) METHOD AND APPARATUS FOR TIMING AND/OR FREQUENCY SYNCHRONIZATION IN AN RF RECEIVER

(75) Inventor: Peter Smidth, San Luis Obispo, CA (US)

(73) Assignee: Exalt Communications Inc., Campbell, CA (US)

( * ) Notice: Subject to any disclaimer, the term of this patent is extended or adjusted under 35 U.S.C. 154(b) by 1234 days.

(21) Appl. No.: 11/302,102

(22) Filed: Dec. 12, 2005

(51) Int. Cl.
*H04L 7/00* (2006.01)
*H04L 7/02* (2006.01)
*H04L 7/04* (2006.01)
*H04L 7/06* (2006.01)

(52) U.S. Cl. ........ 375/366; 375/365; 375/367; 375/368; 375/373; 375/374; 375/376; 375/336; 375/334; 375/332; 375/316; 375/354; 375/359; 375/361; 375/362

(58) Field of Classification Search .......... 375/365, 375/366, 367, 368, 373, 374, 376, 336, 334, 375/322, 316, 354, 359, 361, 362
See application file for complete search history.

(56) References Cited

U.S. PATENT DOCUMENTS

| | | | |
|---|---|---|---|
| 4,764,921 A | 8/1988 | Graves et al. | |
| 6,018,551 A * | 1/2000 | Tanaka et al. | 375/326 |
| 6,336,201 B1 * | 1/2002 | Geile et al. | 714/755 |
| 6,934,245 B2 * | 8/2005 | Kwak et al. | 370/204 |
| 7,050,826 B2 * | 5/2006 | Becker et al. | 455/550.1 |
| 7,099,244 B2 * | 8/2006 | Nakata et al. | 369/47.19 |
| 7,206,367 B1 * | 4/2007 | Moore | 375/354 |
| 2001/0033611 A1 * | 10/2001 | Grimwood et al. | 375/219 |
| 2002/0060996 A1 * | 5/2002 | Kwak et al. | 370/335 |
| 2002/0158814 A1 * | 10/2002 | Bright et al. | 345/7 |
| 2003/0210746 A1 * | 11/2003 | Asbeck et al. | 375/247 |
| 2004/0131028 A1 | 7/2004 | Schiff et al. | |
| 2004/0250049 A1 * | 12/2004 | Becker et al. | 712/35 |
| 2005/0025194 A1 * | 2/2005 | Adjakple et al. | 370/516 |
| 2005/0219068 A1 * | 10/2005 | Jones et al. | 341/50 |
| 2008/0122667 A1 * | 5/2008 | Bentvelsen et al. | 341/106 |
| 2008/0144701 A1 * | 6/2008 | Gold | 375/132 |
| 2009/0116561 A1 * | 5/2009 | Park et al. | 375/240.25 |
| 2009/0316665 A1 * | 12/2009 | Adjakple et al. | 370/336 |
| 2010/0040347 A1 | 2/2010 | Kent et al. | |
| 2010/0046554 A1 | 2/2010 | Wilkinson | |

* cited by examiner

*Primary Examiner* — David C. Payne
*Assistant Examiner* — Erin File
(74) *Attorney, Agent, or Firm* — Hickman Palermo Truong & Becker

(57) ABSTRACT

The present invention provides methods and systems for allowing a receiver in a (wireless) communication system to synchronize its timing and frequency subsystems in accordance with a received signal. In accordance with one aspect, a method is provided in which a relative time of arrival of sync values provided in a received signal are determined and used to align the receiver's reference signal(s) accordingly. Other aspects of the invention will become apparent from the detailed description of exemplary embodiments that follows.

15 Claims, 5 Drawing Sheets

Transmitter Side Implementation

| Sync Word 102 | Sync Word 104 | Packet 100 |

Fig. 1
(Prior Art)

METHOD AND APPARATUS FOR TIMING AND/OR FREQUENCY SYNCHRONIZATION IN AN RF RECEIVER

FIELD OF THE INVENTION

The present invention relates to digital modems for data communications, including wireless radios, and in particular, to systems and methods for reference timing (clock) and frequency synchronization in such systems.

BACKGROUND OF THE INVENTION

In digital wireless communications systems, two devices in communication with each other must generally perform timing and carrier frequency synchronization in order to detect and process information that is being transmitted between them. For example, a receiver generally needs to synchronize (sometime also referred to as "acquire" or "lock") its reference (digital demodulator) clock and (carrier) frequency, as provided by a local oscillator (LO) to signals transmitted thereto by a transmitting device, in order to properly process the information contained in such signals.

Some past techniques for synchronization have included sweeping or stepping a clock or local oscillator until a lock is detected; using a decision directed technique; using a Costas loop (for carrier frequency); squaring magnitudes (clock timing) based feedback; and differential sync vector measurement (carrier frequency).

One prior technique for obtaining frequency and timing synchronization is to provide a synchronization word or value in a packet, and use the phase difference (in spatial or vector domain) between two or more such values as an indicator for how much to adjust, for example, a local oscillator to be synchronized with the carrier frequency of the received signal.

FIG. 1 is a diagram of a data packet having sync words, according to the prior art. As shown, a data packet 100 includes a synchronization (or "sync") word 102 and a synch word 104. Using prior techniques, the relative vector/spatial phase difference between synch words 102 and 104 may be determined and used for synchronization.

Unfortunately, in a number of wireless communication systems, carrier frequency may be relatively far off at a receiver, especially in high frequency systems where the ratio between the carrier frequency and symbol rate of a transmitted signal is high. Also, if a synch word is large (e.g., 100's of symbols in length), the phase difference may become so large that such prior techniques may not provide adequate results. As a result, such past synchronization techniques may require iteration or "sweeping" for timing and frequency detection, and thus may not provide satisfactory performance in some situations.

Thus, what is needed is an improved system and method for providing timing and frequency synchronization that does not suffer from the drawbacks of past methods and systems.

SUMMARY

The present invention provides methods and systems for allowing a receiver in a (wireless) communication system to synchronize its timing and frequency subsystems in accordance with a received signal. In accordance with one aspect, a method is provided in which a relative time of arrival of sync values provided in a received signal are determined and used to align the receiver's reference signal(s) accordingly.

Other aspects of the invention will become apparent from the detailed description of exemplary embodiments that follows.

BRIEF DESCRIPTION OF THE FIGURES

The present invention is illustrated by way of example and not limitation in the Figures of the accompanying drawings in which:

FIG. 1 is a diagram of a data packet having sync words, according to the prior art;

DESCRIPTION OF THE EMBODIMENTS

The present invention provides methods and systems for synchronizing one or more subsystems (e.g., carrier frequency/local oscillator, timing clock, etc.) to a received signal(s). In accordance with one aspect of the invention, two or more synch values are transmitted such that when received by a receiver, the synch values are not (carrier or clock) frequency-dependent. Using the relative time of arrival of the synch words, one or more internal subsystems (e.g., local oscillator, clock, etc.) may be synchronized to the received signal for allowing further detection and processing of other information (e.g., data payload) transmitted in the signal(s) being received.

Overview of an Exemplary Method

Figure 2:
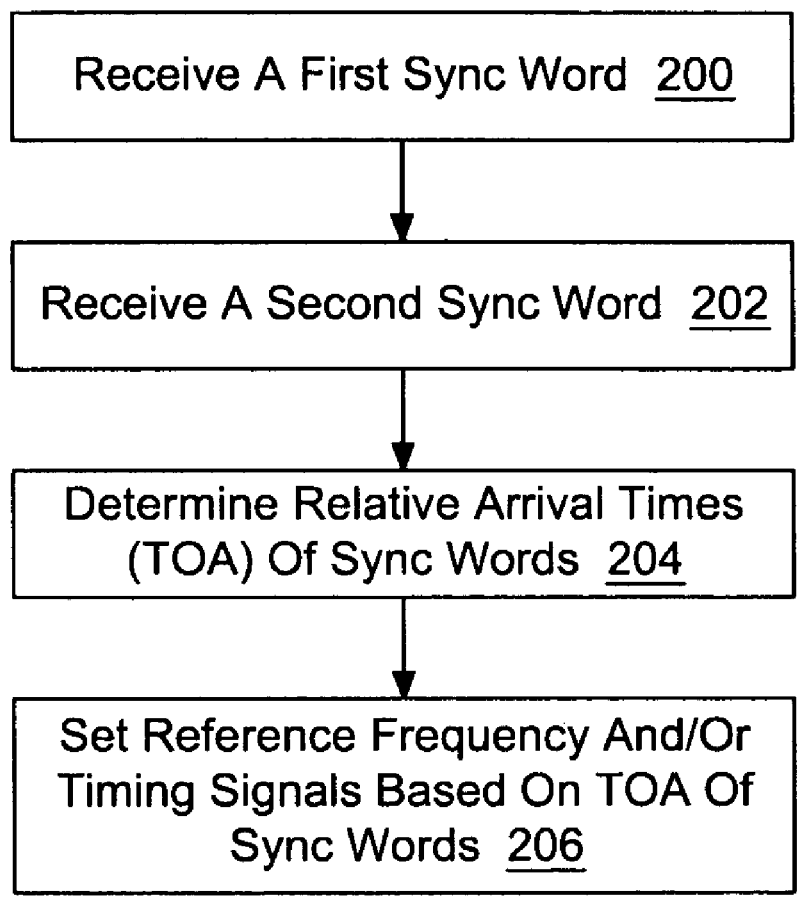
FIG. 2 is a flow diagram illustrating a method for performing reference frequency and/or timing synchronization in a receiving wireless communication device, in accordance with one embodiment of the invention.

FIG. 2 is a flow diagram illustrating a method for performing reference frequency and/or timing synchronization in a receiving wireless communication device, in accordance with one embodiment of the invention. At block 200, a first sync word is received and detected. At block 202, a second sync word is received and detected. At block 204, the relative time of arrival of the first and second sync words is determined. Finally, at block 206, the relative time of arrival of the first and second sync words is used as a basis to set one or more internal subsystems. In one embodiment, both an internal data timing clock and one or more local oscillators of the receiving device are set as a function of the time of arrival determined at block 204.

Exemplary System Architecture

Figure 3A:
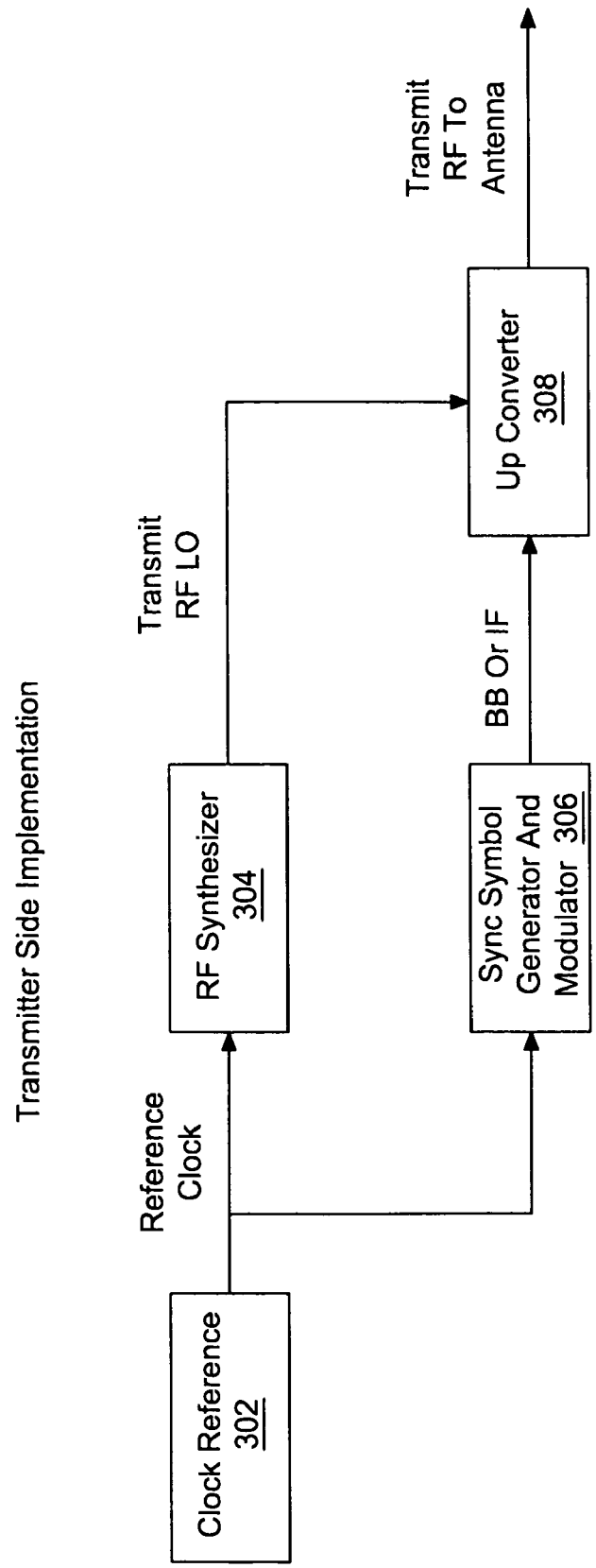
FIG. 3A is a block diagram illustrating an exemplary transmitter side subsystem architecture for transmitting signals for allowing timing and frequency synchronization/acquisition, according to exemplary embodiments of the invention.
Figure 3B:
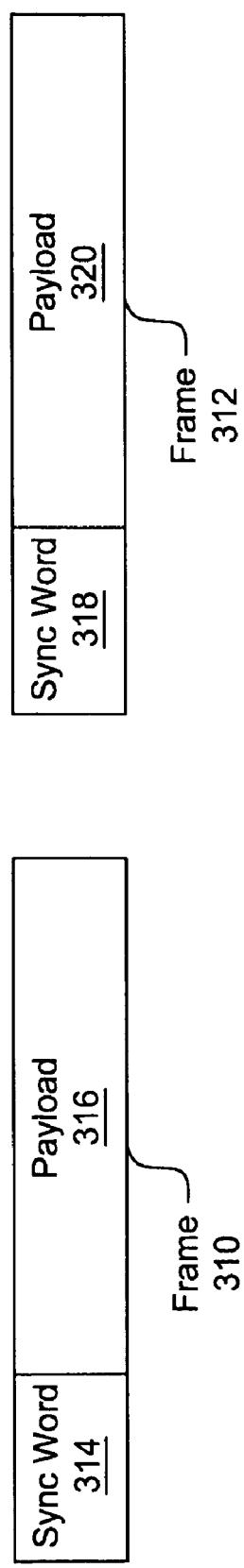
FIG. 3B illustrates a frame structure of transmitted/received signals including sync words generated in accordance with one embodiment of the invention.

This section provides an exemplary architecture of a system within a wireless communication device for transmitting and/or receiving signals in such a way as to provide improved frequency and timing synchronization, according to exemplary embodiments of the invention. FIGS. 3A-3B describe an exemplary transmitter-side architecture, while FIG. 4 describes an exemplary receiver-side implementation.

It should be appreciated by those skilled in the art that each of the circuits, functional units, flow diagram blocks or other modules described with reference to the Figures may be implemented in hardware (e.g., FPGA, ASIC, other integrated circuits, general purpose and/or specialized processors, etc.), software or firmware, or a combination thereof without departing from the spirit or scope of the invention.

Transmitter Subsystem

FIG. 3A is a block diagram illustrating an exemplary transmitter side subsystem architecture for transmitting signals for allowing timing and frequency synchronization/acquisition, according to exemplary embodiments of the invention. The subsystem 300 shown in FIG. 3A may be implemented in a variety of wireless and/or wireline communication devices. In one embodiment, the subsystem 300 is part of a point-to-point or point-to-multipoint microwave radio that may be used for backhaul or other relatively high data throughput, high data rate, applications. However, it will be appreciated to those skilled in the art from the foregoing description that the invention may be employed in a wide variety of applications where a receiving device should synchronize its internal subsystems, such as its reference symbol clock and/or local oscillator, to a received signal transmitted by transmitting system, such as may incorporate the transmitting subsystem 300 shown in FIG. 3A.

As illustrated in FIG. 3A, the subsystem 300 includes a reference clock 302 that provides a reference clock signal to an RF synthesizer 304 and a sync symbol generator and modulator 306. The sync symbol generator and modulator 306, in accordance with one embodiment of the invention, uses the reference clock signal to generate and modulate a sync value that can be relatively easily detected by a receiver configured in accordance with some embodiments of the invention, e.g., using differential decoding. In one embodiment, the sync word is modulated using differential Bi-Phase Shift Keying (DBPSK). As known to those skilled in the art, DBPSK is not a spectrally efficient modulation scheme, and is seldom if ever used in applications such as high data rate microwave point-to-point or point-to-multipoint wireless communication devices. However, as described below, some embodiments of the invention take advantage of BPSK's relative immunity to frequency offsets as a means to detect and use the time of arrival between two or more sync words, modulated using DBPSK, for acquiring timing and frequency acquisition.

In turn, the modulated sync value is provided (in baseband or intermediate frequency) to an up converter 308 for up-conversion to RF frequencies for transmission. Using the reference clock, the RF synthesizer generates a transmit RF local oscillator (LO) signal, which is also provided to the up converter 308 for allowing the up converter 308, in turn, to transmit the up-converted sync value at an RF (carrier) frequency to be received by one or more receiving communication devices.

FIG. 3B illustrates a frame structure of transmitted/received signals including sync words generated in accordance with one embodiment of the invention. As shown in FIG. 3B, a frame 310 includes a sync word 314 and payload 316 portions. Similarly, another frame 312 includes a sync word 318 and payload 320 portions. As described in further detail, by using a modulating scheme (e.g., in the sync symbol generator and modulator 306 described above) to generate the sync words 214 and 318 to be frequency dependent, such as DBPSK, and a different modulation scheme for transmitting the payload portions 316 and 320 (e.g., 256QAM or some other relatively more spectrally efficient modulation scheme than used for the sync words), a receiver may detect the relative time of arrivals (TOAs) between the sync words 314 and 318 and use the TOA for frequency and timing synchronization.

In one embodiment, the sync words are maximum length pseudorandom sequences of approximately 31 bits, which may include an additional bit for ensuring DC free. It is sampled at half the symbol rate of the system. Of course, it will be appreciated that any variety of sequences, lengths and sampling schemes may be employed in other embodiments of the invention.

Receiver Subsystem

Figure 4:
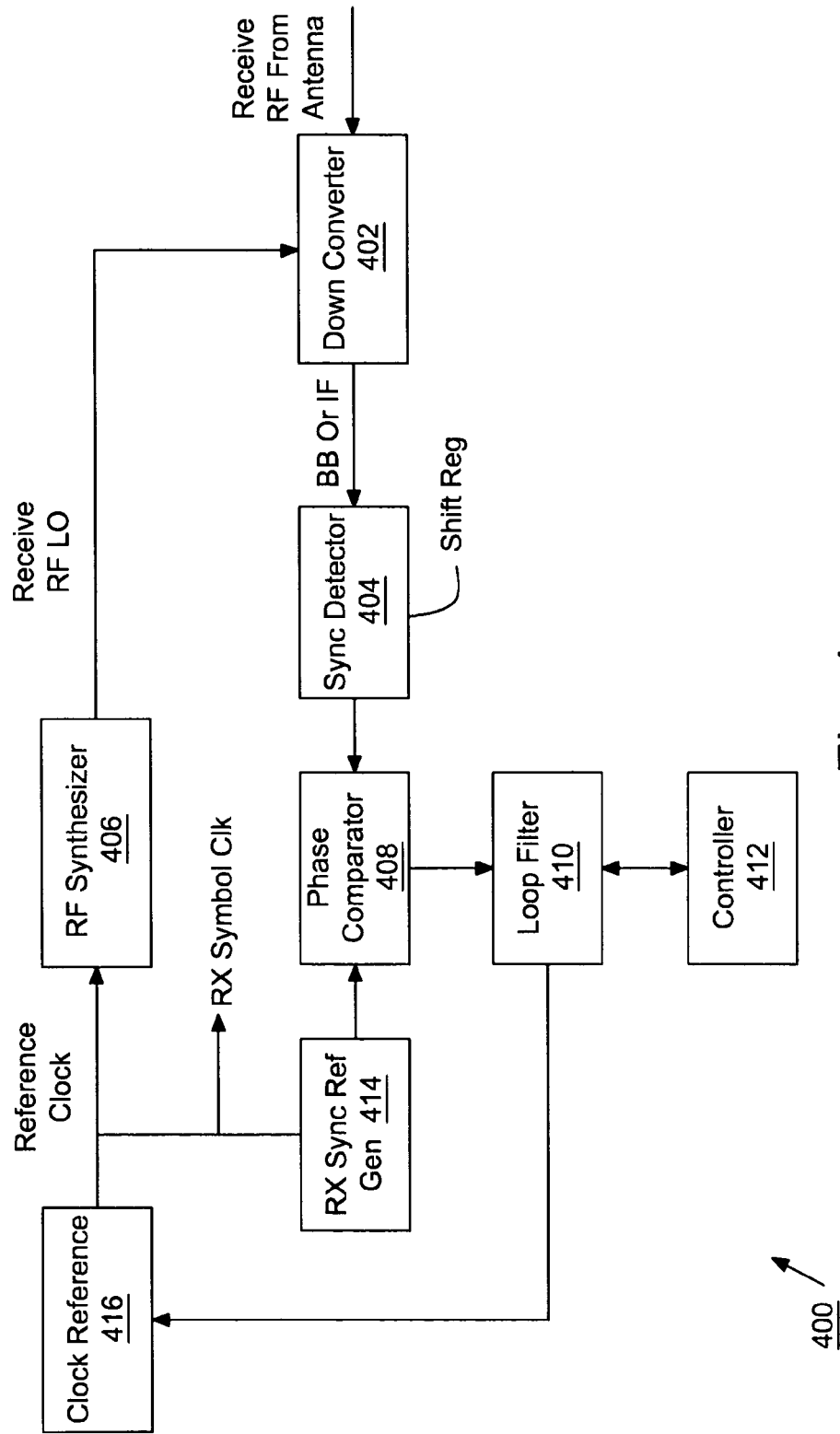
FIG. 4 is a block diagram of a receiving subsystem for providing timing and frequency synchronization, in accordance with one embodiment of the invention.

FIG. 4 is a block diagram of a receiving subsystem for providing timing and frequency synchronization, in accordance with one embodiment of the invention. Shown in FIG. 4 is a frequency and timing synchronization subsystem 400 that includes a down converter 402 which receives signals transmitted in accordance with one or more embodiments of the invention, for example, as described in connection with FIGS. 3A-3B. Using a clock reference 416, the receiver subsystem 400 produces a reference clock signal (e.g., RX symbol clock signal) that is provided to an RF synthesizer 406, which in turn uses the reference clock signal to generate the receive RF local oscillator signal used for down-converting by the down converter 402.

The down-converted received signal(s) is provided by the down converter 402 to a sync detector 404. In one embodiment, the sync detector 404 is configured to perform differential decoding. For example, the sync detector 404 may include a shift register having taps at each bit for performing a bit wise add or other operation between the received value in the shift register and the known value of the sync word. In such an embodiment, for example, when the sum of the value in the shift register (i.e., the received signal) and the known value for the sync word is at a maximum, the sync detector will determine that it has positively detected the sync word.

A phase comparator 408 compares the (timing) phase of the received sync word, as detected by the sync detector 404, to the phase of the internally produced sync word generated, based on the internal reference clock signal, by the RX sync reference generator 414. Based on this comparison, which allows determination of the relative times of arrival of the sync word contained in one or more frames of data, a loop filter 410, can adjust the clock reference 416 so that it is synchronized and locked (using a phase locked loop or PLL) with the (timing of) the received sync word(s). As such, the RF synthesizer, which also is controlled by the clock reference, also locks the carrier frequency for down-conversion synchronization to the carrier frequency of the received RF signal. Similarly, symbol (data) timing can be locked, to the extent symbol timing is dependent on the reference clock signal. As such, the time of arrival of the known sync word allows various internal reference timing and frequencies to be locked to the received signal.

Finally, a controller 412 monitors the state of the system to determine optimum loop performance for the loop filter 410, and as such, may control the loop filter to use wide band loop filtering during initial acquisition, narrow band loop filtering during normal operation of the receiver (to provide relatively better overall signal-to-noise ratio), and may also set the RX sync generator 414 to the same phase as the received signal for relatively faster locking.

In the above embodiment, the following architectural specifications are employed:
  (1), a common clock is used for timing and carrier frequency (LO) generation, both for transmission and reception (though not necessarily shared between the TX and RX subsystems). The common reference thereby provides a fixed relationship between carrier frequency and data timing;

(2) the framing structure includes a sync word that can be detected before the carrier frequency (LO) has been determined; and (3) the common frequency reference is adjustable over a range that exceeds the tolerance of the receiver.

Thus, a system and method for allowing timing and frequency synchronization in a communication device has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" or "some embodiments" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

Each of the claims that follow represent one embodiment of the invention, and as such, each claim on its own is hereby incorporated by reference into this detailed description as a separate, independent embodiment of the invention.

What is claimed is:

1. A method for timing acquisition in a receiver, the method comprising:
   receiving data modulated according to a first modulation scheme;
   receiving a first and a second synch value modulated according to a second modulation scheme;
   wherein the first synch value is included in a first frame and the second synch value is included in a second frame that is different than the first frame;
   generating, based on a reference signal, a receive RF local oscillator signal that is used to down-convert a received RF signal;
   based on the down-converted RF signal, determining a relative time of arrival between the first and second synch values, and
   tuning the reference signal based on a relative time of arrival between the first and the second synch values;
   wherein tuning the reference signal comprises synchronizing a timing of the reference signal to a timing associated with the received RF signal;
   wherein the reference signal is used to process the data modulated according to the first modulation scheme.

2. The method of claim 1, wherein the first and second synch values represent synch words transmitted at a predetermined interval.

3. The method of claim 2, wherein the second modulation scheme is at least one of DBPSK, BPSK, FSK encoding.

4. The method of claim 3, wherein the first modulation scheme involves QAM encoding.

5. The method of claim 1, wherein the second modulation scheme for the first and second synch words is selected to be frequency-insensitive.

6. The method of claim 1, wherein tuning the reference signal comprises tuning a frequency of a local oscillator of a receiver.

7. The method of claim 1, wherein tuning the reference signal comprises tuning a reference clock signal for acquiring the data.

8. The method of claim 3, further comprising differentially decoding the first and second synch values.

9. The method of claim 8, further comprising detecting the first and second synch values using a differential decoder taking into account relative phases changes on a synch value-to-synch-value basis.

10. The method of claim 1, wherein synchronizing a timing of the reference signal to a timing associated with the received RF signal comprises synchronizing a frequency of the reference signal with a frequency associated with the received RF signal.

11. The method of claim 1, wherein synchronizing a timing of the reference signal to a timing associated with the received RF signal comprises synchronizing a phase of the reference signal with a phase associated with the received RF signal.

12. A receiver comprising:
   a reference timing signal generator to generate an internal timing signal:
   a sync detector to detect relative times of arrival of a set of received sync values, the received sync values contained in signals received by the receiver;
   a reference sync generator, coupled to the reference timing signal generator, to generate an internal sync value based on the internal timing signal;
   a comparator, coupled to the sync detector and to the reference sync generator, to compare timing of the internal sync value to the relative times of arrival of the set of received sync values;
   a loop filter, coupled to the comparator and to the reference timing signal generator, to adjust the reference timing signal generator based on the set of received sync values, such that the timing of the internal sync value is in alignment to the relative times of arrival of the set of received sync values; and
   an RF synthesizer that uses the internal timing signal to generate a receive RF local oscillator signal that is used to down-convert a received RF signal received by the receiver, wherein the received RF signal comprises the set of received sync values.

13. The receiver of claim 12, further comprising a symbol clock synchronized as a function of the internal timing signal.

14. A transmitter comprising:
   a reference clock that generates a reference clock signal;

a sync symbol generator that uses the reference clock signal to generate and modulate a plurality of sync values;

a RF synthesizer that uses the reference clock signal to generate a transmit RF local oscillator signal;

an up converter that up-converts the plurality of sync values to RF frequencies;

wherein the transmit RF local oscillator signal allows the up converter to transmit the up-converted sync values at an RF frequency that is to be received by a receiving communication device;

wherein the relative time of transmission between the up-converted sync values indicates a timing associated with the reference clock signal.

15. The transmitter of claim 14, wherein the sync symbol generator is configured to modulate the plurality of sync values using differential Bi-Phase Shift Keying (DBPSK).

* * * * *